W. T. NICHOLSON.
FILES.
No. 184,543. Patented Nov. 21, 1876.
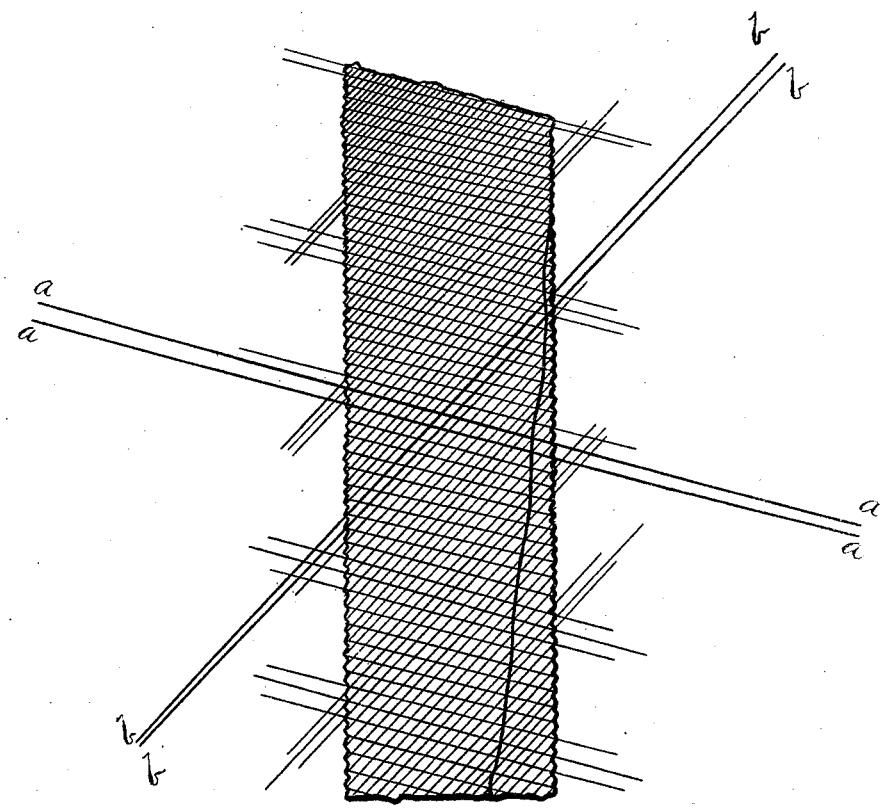

UNITED STATES PATENT OFFICE.

WILLIAM T. NICHOLSON, OF PROVIDENCE, RHODE ISLAND, ASSIGNOR TO NICHOLSON FILE COMPANY, OF SAME PLACE.

IMPROVEMENT IN FILES.

Specification forming part of Letters Patent No. 184,543, dated November 21, 1876; application filed March 25, 1876.

*To all whom it may concern:*

Be it known that I, WILLIAM T. NICHOLSON, of the city and county of Providence, in the State of Rhode Island, have invented certain new and useful Improvements in Files; and I do hereby declare that the following specification, taken in connection with the drawings making a part of the same, is a full, clear, and exact description thereof.

The file hereinafter described is an improvement upon the one for which Letters Patent were granted to me dated September 27, 1864, and numbered 44,443. The successive rows of teeth of a file described in said patent, which is thicker near the middle of its length than at the tip and heel, will be separated from each other by lands or spaces, which regularly and progressively increase in width from the tip toward the middle, and as regularly decrease in width from near the middle toward the heel, the characteristic feature of said file being that the longitudinal lines of teeth, instead of being regularly aligned, as they would be if the successive rows were of equal distances apart, will diverge from the heel toward the middle, and then converge toward the tip if the file is made with its teeth coarser at the middle than at the ends, and will converge from heel to tip if the file is made with its teeth progressing from fine to coarser from the tip toward the heel.

My invention consists in arranging the teeth of a file of the general character described in my said above-mentioned patent, so that the consecutive rows of teeth shall not be exactly parallel with each other, by forming each succeeding row at a slight angle with the preceding row, and reversing the angle of inclination for each row consecutively, whereby, and as the result of the teeth being variably spaced from the tip to the heel of the file according to a regular ratio of increase or of decrease as to the width of the spacings, and the several rows of teeth being set angularly with respect to each other, no tooth in any one longitudinal row of teeth is in alignment with any other tooth in the same row.

A file containing my invention is illustrated in the drawing, from which it appears that if any two lines of teeth, *a a* or *b b*, are produced, they will converge and meet in a common point upon one side of the file or the other. This angular arrangement of the rows of teeth in combination with the characteristic that the file possesses of having its rows of teeth relatively farther apart from the tip toward the middle, and relatively nearer together from near the middle toward the heel; or if the kind of file requires it progressively farther apart from the tip toward the heel, throws out of alignment each tooth of any longitudinal row of teeth with every other tooth in the same row.

The improved file above described possesses distinct and peculiar advantages as a tool for dressing metal. Suitable machinery for producing such files is shown and described in an application for Letters Patent for improvements in machinery for cutting files, filed by me in the Patent Office December 16, 1875, to which, for a particular description of the same, reference may be had.

What I claim as my invention, and desire to secure by Letters Patent, is—

A file, whose rows of teeth from tip to heel are spaced relatively farther apart from the tip toward the middle, and relatively nearer together from near the middle toward the heel, or progressively farther apart from the tip toward the heel, but whose rows of teeth are set at reversed angles with respect to each other and the axis of the file, whereby no tooth in any one longitudinal row is in alignment with any other tooth in the same row, substantially as described.

W. T. NICHOLSON.

Witnesses:
J. D. THURSTON,
J. O. B. WOODS.